US008830527B2

(12) United States Patent
Matsui

(10) Patent No.: US 8,830,527 B2
(45) Date of Patent: Sep. 9, 2014

(54) PRINT DATA PROCESSING APPARATUS

(71) Applicant: Canon Kabushiki Kaisha, Tokyo (JP)

(72) Inventor: Kenta Matsui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/933,998

(22) Filed: Jul. 2, 2013

(65) Prior Publication Data

US 2014/0016148 A1 Jan. 16, 2014

(30) Foreign Application Priority Data

Jul. 11, 2012 (JP) ................... 2012-155540

(51) Int. Cl.
*G06F 15/00* (2006.01)
*G06K 1/00* (2006.01)
*H04N 1/60* (2006.01)
*G06F 3/12* (2006.01)
*G06K 15/02* (2006.01)

(52) U.S. Cl.
CPC .......... *G06K 15/1802* (2013.01); *G06F 3/1285* (2013.01); *G06K 15/1814* (2013.01); *G06F 3/1215* (2013.01); *G06F 3/1293* (2013.01); *G06F 3/1247* (2013.01)
USPC .......................................... 358/1.9; 358/1.15

(58) Field of Classification Search
CPC ... G06F 3/1285; G06F 3/1215; G06F 3/1247; G06K 15/1814; G06K 15/1802
USPC ................................. 358/1.9, 1.15, 1.14, 1.13
See application file for complete search history.

(56) References Cited

U.S. PATENT DOCUMENTS

2002/0001101 A1* 1/2002 Hamura et al. ............... 358/1.17
2008/0273226 A1* 11/2008 Adachi et al. ................ 358/1.18

FOREIGN PATENT DOCUMENTS

JP 4514168 5/2010

* cited by examiner

*Primary Examiner* — Douglas Tran
(74) *Attorney, Agent, or Firm* — Fitzpatrick, Cella, Harper & Scinto

(57) ABSTRACT

Printing which satisfies an index of performance of a printing apparatus may be unfeasible depending on the sizes of image information and attribute information which a print data processing apparatus transfers to the printing apparatus, a network band, or the index of performance of the printing apparatus. The print data processing apparatus converts a difficult-to-compress attribute contained in the attribute information into an easy-to-compress attribute, and transfers the converted attribute information to the printing apparatus. The printing apparatus extracts the attribute converted by the print data processing apparatus, by using the image information.

14 Claims, 15 Drawing Sheets

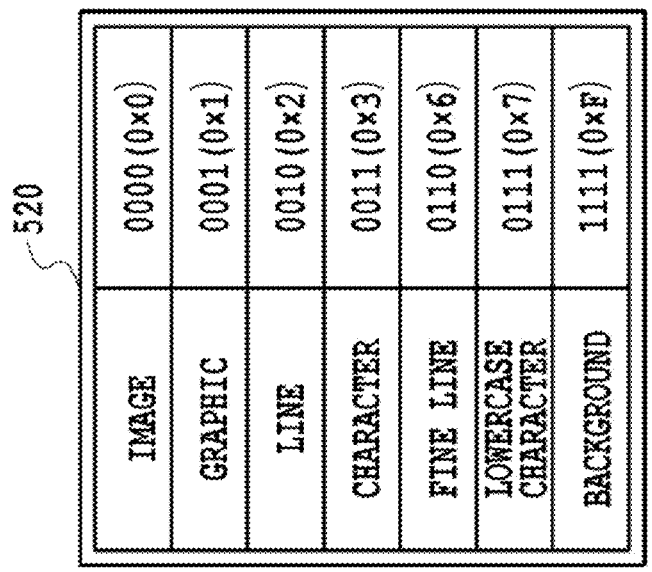
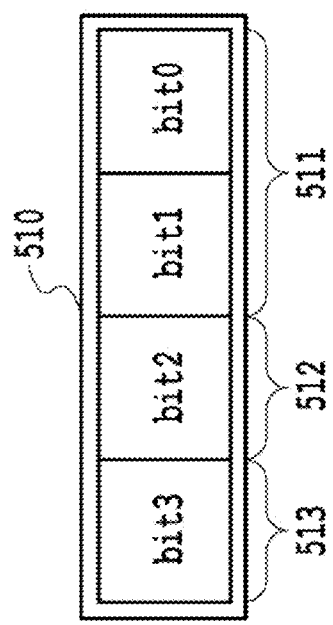
FIG.5B
FIG.5A

| | | | Size of transfer data [MB] | | |
|---|---|---|---|---|---|
| Index of performance of printing apparatus [PPM] (A) | Network band [MB/sec] (B) | Transfer performance [MB] 60/(A)×(B) | No conversion of attribute | First conversion of attribute | Second conversion of attribute |
| 30 (2sec/page) | 5.0 | 10.0 | 8.0 (4.8 MB of image information / 3.2 MB of attribute information) | NOT NEEDED | NOT NEEDED |
| 40 (1.5sec/page) | 5.0 | 7.5 | 8.0 (4.8 MB of image information / 3.2 MB of attribute information) | 7.7 (4.8 MB of image information / 2.9 MB of attribute information) | 7.4 (4.8 MB of image information / 2.6 MB of attribute information) |
| 40 (1.5sec/page) | 7.0 | 10.5 | 8.0 (4.8 MB of image information / 3.2 MB of attribute information) | NOT NEEDED | NOT NEEDED |

PRINT DATA PROCESSING APPARATUS

BACKGROUND OF THE INVENTION

1. Field of the Invention

The present invention relates to a print data processing apparatus for processing print data.

2. Description of the Related Art

There is a printing apparatus which analyzes print data inputted to the apparatus, outputs bitmap image information and bitmap attribute information indicating attributes of pixels which form a character, an image, or a graphic, and performs image processing of the image information by referring to the attribute information (refer to Japanese Patent No. 4514168, for example.)

Heretofore, the process of analyzing print data and outputting image information and attribute information has been performed internal to the printing apparatus. Meanwhile, with improvements in CPU processing capabilities of a server and advances in network technology, studies have been made on a printing apparatus of new configuration in which a process alone which is dependent on an engine of the printing apparatus is performed internal to the printing apparatus, while a process which is not dependent on the engine is performed by an external server. The new configuration requires the process of transferring the image information and the attribute information to the printing apparatus, because the analysis of the print data and the outputting of the image information and the attribute information, which are not dependent on the engine, are performed by the external server.

The process of transferring the image information and the attribute information may cause a bottleneck in performance. In this case, the printing apparatus which receives the image information and the attribute information and performs a printing process is incapable of printing which satisfies PPM (Page Per Minute; the number of printable pages per minute) serving as an index of performance.

SUMMARY OF THE INVENTION

A print data processing apparatus according to the present invention includes a generating unit configured to generate image information and attribute information from print data; a converting unit configured to convert the attribute information generated by the generating unit; a compressing unit capable of compressing the image information generated by the generating unit, and the attribute information converted by the converting unit; and a transmitting unit configured to transmit the image information and the attribute information compressed by the compressing unit, as transfer data, to a printing apparatus.

According to the present invention, the print data processing apparatus, in a case where transferring image information and attribute information to the printing apparatus, performs conversion of the attribute information according to transfer performance. The converted attribute information is of such size as not to form a bottleneck in the process of transferring the image information and the attribute information, which in turn enables the printing apparatus to perform a printing process which satisfies an index of performance.

Further features of the present invention will become apparent from the following description of exemplary embodiments (with reference to the attached drawings).

BRIEF DESCRIPTION OF THE DRAWINGS

FIG. 5A is a diagram illustrating an example of a configuration of a bit string of the attribute information in the first embodiment of the present invention;

FIG. 5B is a table illustrating an example of a configuration of a bit string of the attribute information in the first embodiment of the present invention;

FIG. 14 is a table illustrating an example of a relationship between an index of performance of the printing apparatus and transfer performance in the first embodiment of the present invention.

DESCRIPTION OF THE EMBODIMENTS

Embodiments of the present invention will be described below with reference to the drawings.

First Embodiment

Figure 1:
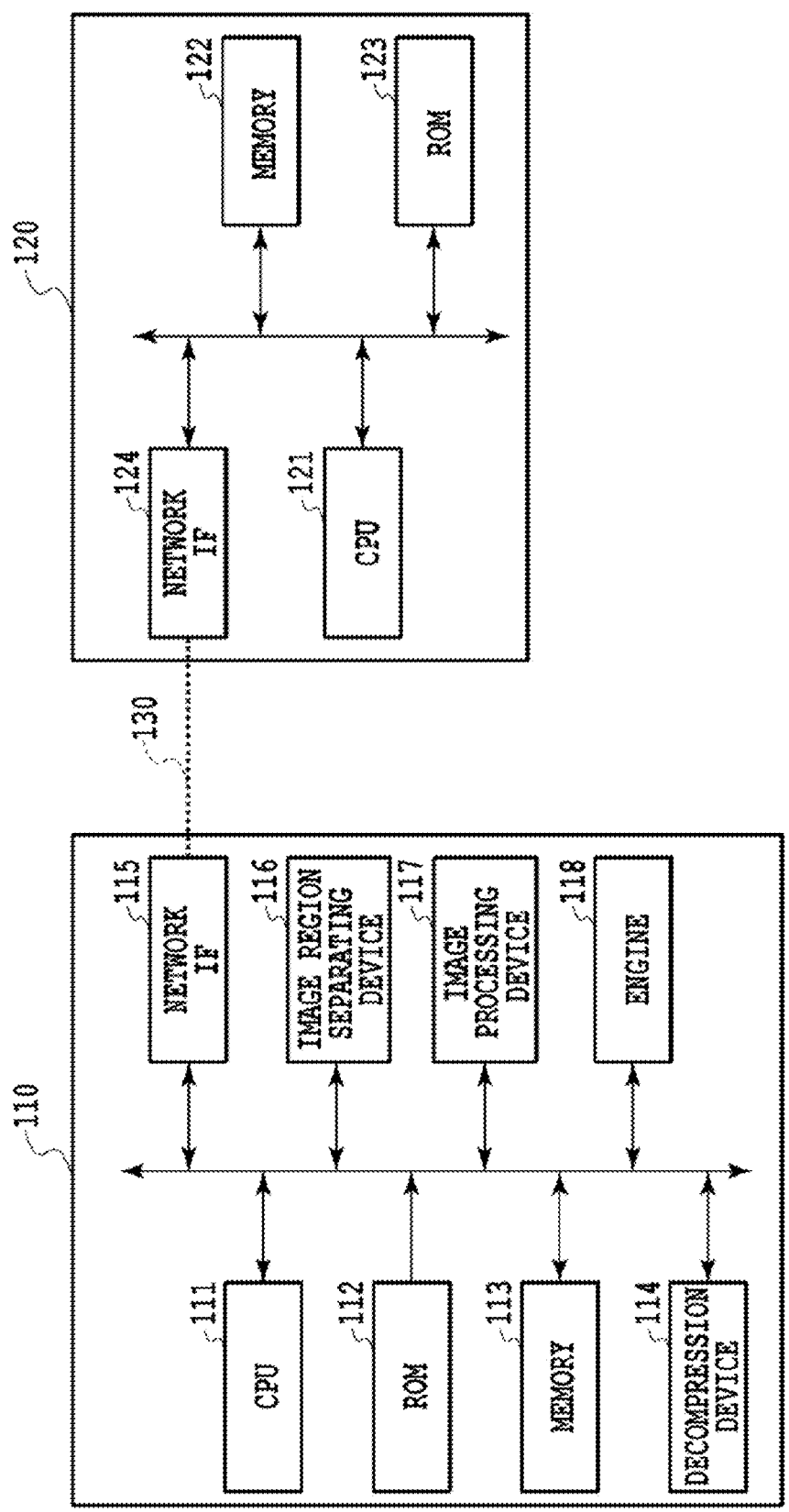
FIG. 1 is a diagram illustrating an example of a hardware configuration of a printing apparatus and a print data processing apparatus in a first embodiment of the present invention.

FIG. 1 is a diagram illustrating an example of a hardware configuration of a printing apparatus 110 and a print data processing apparatus 120 connected by a network 130 in a first embodiment. Incidentally, the printing apparatus 110 and the print data processing apparatus 120 may both be called "print data processing apparatus" in abroad sense in that they are apparatuses for processing data for use in printing. However, an apparatus which receives and processes print data such as PDL (page description language) is herein described as the "print data processing apparatus" 120 in a narrow sense for convenience of explanation. Also, an apparatus which receives data processed by the print data processing apparatus 120 and performs a printing process by using the received data is described as the printing apparatus 110.

A CPU 111 is a CPU (Central Processing Unit) of the printing apparatus 110. Software 210 of the printing apparatus to be described later runs on the CPU 111.

A memory 113 is RAM (Random Access Memory) accessible by the CPU 111. The memory 113 is utilized as a destination to reserve memory required for execution of the software 210 of the printing apparatus to be described later.

ROM 112 is ROM (Read Only Memory) of the printing apparatus 110. A program of the software 210 of the printing apparatus to be described later is stored in the ROM 112 and is loaded into the CPU 111 for execution.

A decompression device 114 is hardware capable of decompressing compressed data irrespective of lossless or lossy compression.

A network IF 115 is an interface connected to the network 130 to transmit and receive data to and from the print data processing apparatus 120.

An image region separating device 116 is hardware capable of receiving input of image information and extracting attributes of pixels of the image information thereby to output attribute information. Details of the image information will be described later.

An image processing device 117 is hardware which receives input of the image information and the attribute information, performs image processing of the image information while referring to the attribute information, and outputs image data for print. Details of the attribute information will be described later.

An engine 118 is a printing engine for printing the image data for print outputted by the image processing device 117 on printing paper.

A CPU 121 is a CPU (Central Processing Unit) of the print data processing apparatus 120. Software 220 of the print data processing apparatus to be described later runs on the CPU 121. A memory 122 is RAM (Random Access Memory) accessible by the CPU 121. The memory 122 is utilized as a destination to reserve memory required for execution of the software 220 of the print data processing apparatus to be described later.

ROM 123 is ROM (Read Only Memory). A program of the software 220 of the print data processing apparatus to be described later is stored in the ROM 123 and is loaded into the CPU 121 for execution.

A network IF 124 is an interface connected to the network 130 to transmit and receive data to and from the printing apparatus 110.

Figure 2:
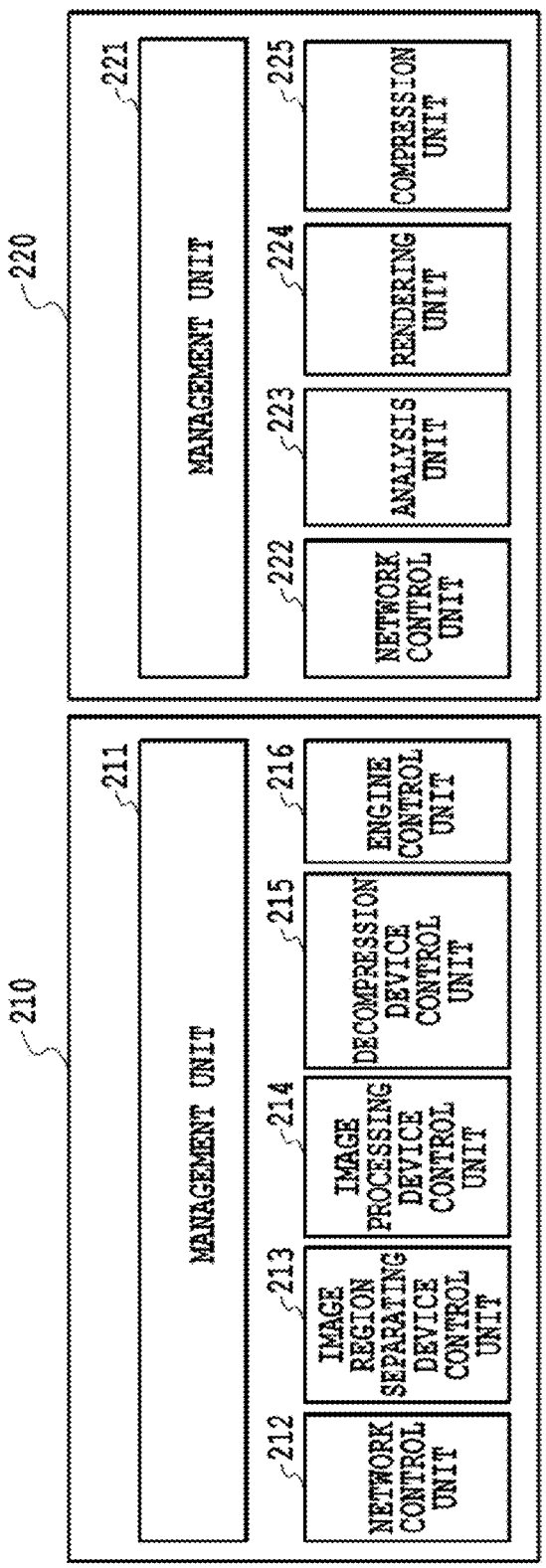
FIG. 2A is a diagram illustrating an example of a software module configuration of the printing apparatus in the first embodiment of the present invention.
FIG. 2B is a diagram illustrating an example of a software module configuration of the print data processing apparatus in the first embodiment of the present invention.

FIGS. 2A and 2B are diagrams illustrating an example of a software configuration of the printing apparatus 110 and the print data processing apparatus 120, respectively.

The software 210 of the printing apparatus 110 is formed of six software modules, for example. A management unit 211 is a module to manage the overall processing of the printing apparatus. A network control unit 212 is a module to control network connection or data transmission and reception. An image region separating device control unit 213, an image processing device control unit 214, and a decompression device control unit 215 are modules to control the image region separating device 116, the image processing device 117, and the decompression device 114, respectively, which are the hardware of the printing apparatus 110. The decompression device control unit 215 decompresses compressed image information and attribute information received by the network control unit 212. The image region separating device control unit 213 extracts the attribute information from the image information decompressed by the decompression device control unit 215. The image processing device control unit 214 outputs image data for print by performing image processing using the attribute information extracted by the image region separating device control unit 213 and the image information and the attribute information decompressed by the decompression device control unit 215. An engine control unit 216 is a module to control the engine 118 of the printing apparatus 110. The engine control unit 216 performs printing using the image data for print outputted by the image processing device control unit 214.

Meanwhile, the software 220 of the print data processing apparatus 120 is formed of five software modules, for example. A management unit 221 is a module to manage the overall processing of the print data processing apparatus. A network control unit 222 is a module to control network connection or data transmission and reception. An analysis unit 223 is a module to analyze print data acquired by the print data processing apparatus. A rendering unit 224 is a module which receives input of analytical results obtained by the analysis unit 223 analyzing the print data and outputs image information and attribute information. A compression unit 225 is a module capable of compressing each of the image information and the attribute information outputted by the rendering unit 224.

Figure 3:
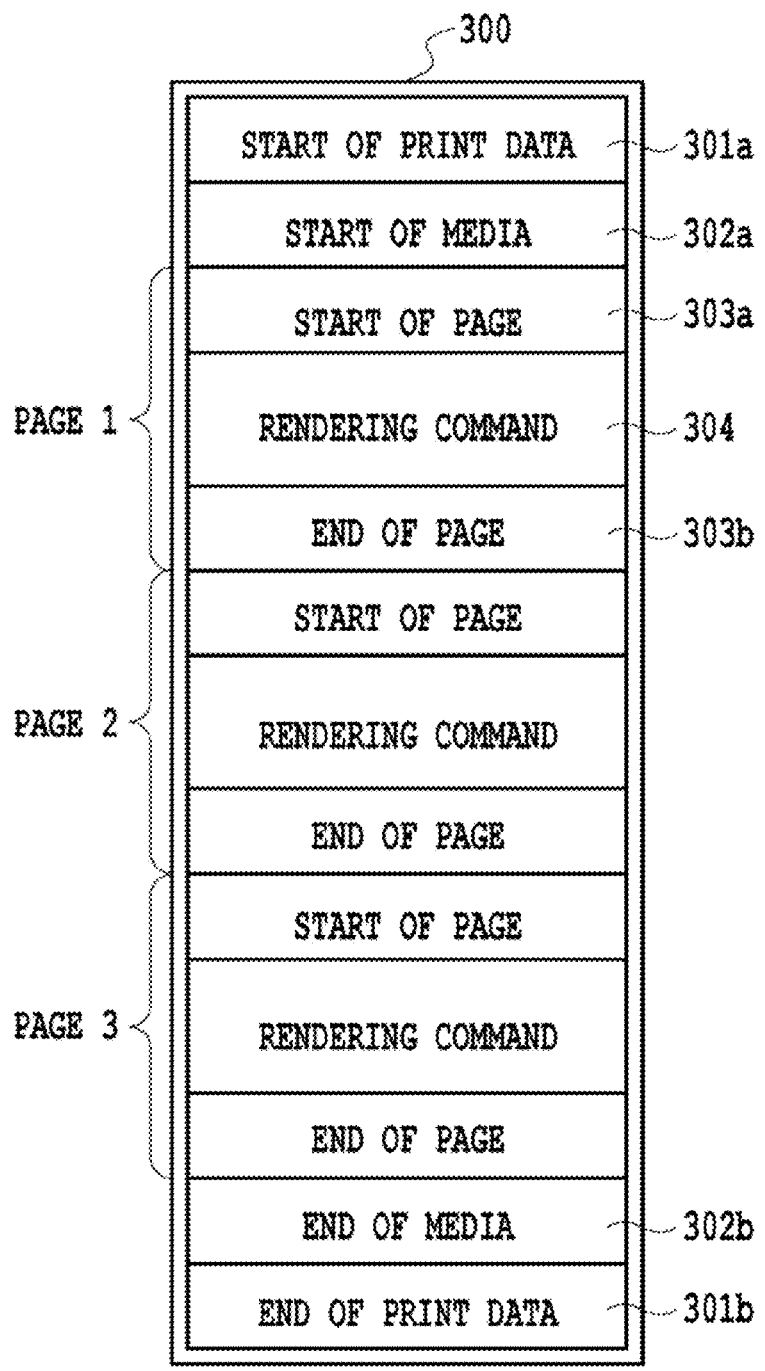
FIG. 3 is an illustration of an example of a data configuration of print data in the first embodiment of the present invention.
Figure 4:
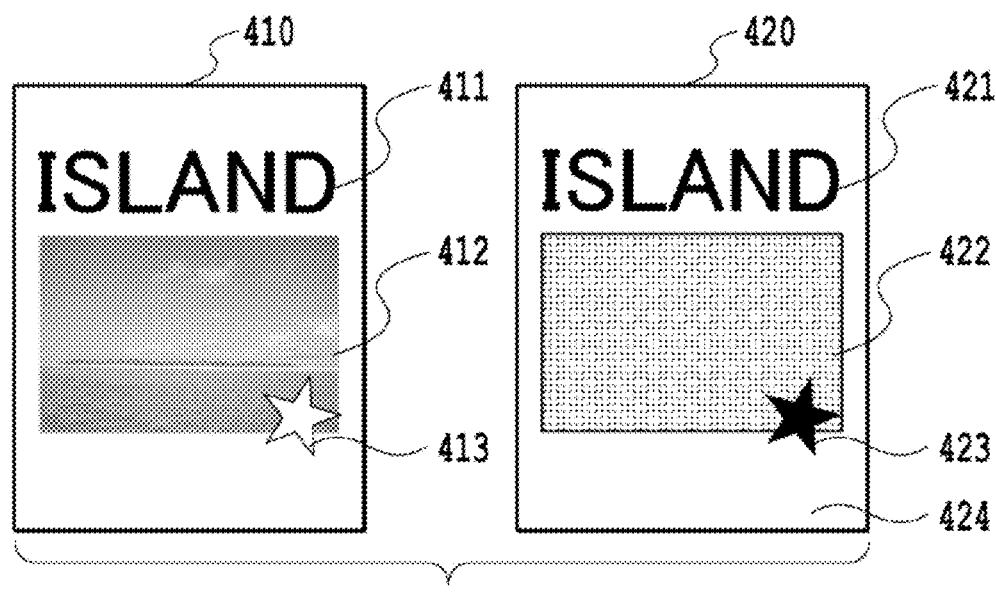
FIG. 4 is an illustration of an example of image information and attribute information in the first embodiment of the present invention.

FIG. 3 illustrates an example of a data structure of print data in the first embodiment, and FIG. 4 illustrates an example of image information and attribute information in the first embodiment.

Print data 300 is formed of plural commands as given below. A start-of-print-data command 301a indicates the start of the print data and is paired with an end-of-print-data command 301b indicating the end of the print data. Information contained in the start-of-print-data command 301a is valid until the end-of-print-data command 301b. A start-of-media command 302a contains information indicating the type of printing paper and is paired with an end-of-media command 302b. Information in the start-of-media command 302a is valid until the end-of-media command 302b. A start-of-page command 303a indicates the start of a page and is paired with an end-of-page command 303b.

A rendering command 304 is a rendering command to render an object of a rendering object. A rendering command, such for example as a character rendering command to render a character or an image rendering command to render an image, is present for each attribute of the object. The analysis unit 223 can analyze the rendering command thereby to determine whether the object of the rendering object is a character or an image, for example, or equivalently, to determine the attribute of the object. Then, the rendering unit 224 outputs image information 410 obtained by bitmapping the shape of the object, and attribute information 420 obtained by bitmapping the attribute of the object, based on analytical results obtained by the analysis unit 223.

In the first embodiment, each pixel of the image information 410 is formed of a total of 24 bits representing RGB values each composed of 8 bits. Each pixel of the attribute information 420 is formed of 4 bits designated by 510 in FIG. 5A. Combinations of bit 0 and bit 1 designated by reference numeral 511 represent basic objects, specifically, an image (00), a graphic (01), a line (10), and a character (11). In a case where bit 2 designated by reference numeral 512 is one, this indicates that an object is a small object or a fine line object. In a case where bit 3 designated by reference numeral 513 is one, this indicates that a pixel is not an object but is a background underlying the object at the time of rendering of the object. A relationship between all attributes of objects and bit strings, as employed in the first embodiment, is as illustrated in Table 520. Incidentally, in an example illustrated in FIG. 5B, description is given with regard to an instance where the background is not limited to bit 3 and other bits are also one.

In a case where the value of a region designated by 421 where "ISLAND" is rendered, in the attribute information 420, is "0x3," this indicates that a region 411 where "ISLAND" is rendered, in the image information 410, has a character attribute. Likewise, in a case where the values of rendering regions 422, 423 are "0x0" and "0x1," respectively, this indicates that a rendering region 412 has an image attribute and a rendering region 413 has a graphic attribute. The attribute of a region 424 where no object is rendered has the value "0xF" representing a background attribute.

Figure 6:
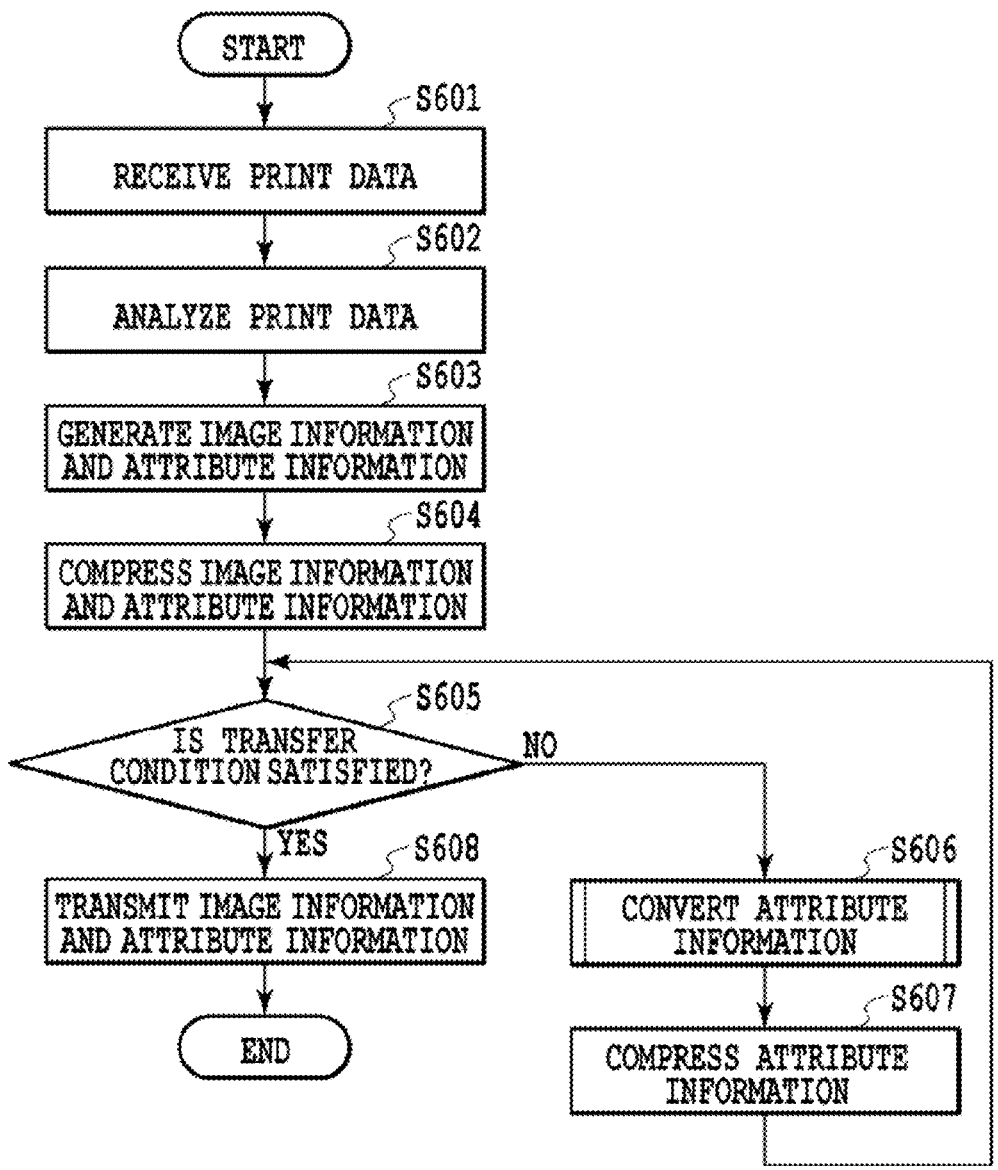
FIG. 6 is a flowchart illustrating an example of main processing by the print data processing apparatus in the first embodiment of the present invention.

FIG. 6 is a flowchart illustrating an example of processing by the software 220 of the print data processing apparatus in the first embodiment. The processing illustrated in FIG. 6 is implemented by the CPU 121 executing the program stored in the ROM 123.

At step S601, the management unit 221 of the print data processing apparatus receives print data through the network IF 124 by utilizing the network control unit 222. The print data may be received from the printing apparatus 110 or may be received from other apparatuses together with a control command for the printing apparatus 110 to perform printing.

At step S602, the analysis unit 223 analyzes the received print data. The analysis unit 223 outputs analytical results by referring to a rendering command contained in the print data, as described above.

At step S603, the rendering unit 224 receives input of the analytical results obtained by the analysis unit 223, and generates and outputs image information and attribute information as described with reference to FIG. 4.

At step S604, the compression unit 225 compresses each of the image information and the attribute information outputted by the rendering unit 224. At this time, the compression unit 225 performs lossy compression on the image information and performs lossless compression on the attribute information. As described above, the attribute information provides bit-by-bit, clear indication of a difference in information in a region, and thus, the lossless compression which causes no occurrence of missing information at the time of decompression is adopted for the attribute information. Meanwhile, even if missing information occurs in the image information at the time of decompression, the missing information can be interpolated by surrounding image information and attribute information, and thus, the lossy compression with higher compression ratio is adopted for the image information. Preferably, the lossy compression is adopted for the image information, taking transfer performance into account; however, the lossless compression may be adopted for the image information according to operation.

At step S605, the management unit 221 determines whether a transfer condition is satisfied, or equivalently, whether the problem of transfer performance is cleared up. Here, the transfer performance can be obtained by Equation (1).

$$60/\text{an index of performance of the printing apparatus [ppm]} * \text{a network band [MB/sec]} \quad (1)$$

If the size of transfer data is smaller than the value of the transfer performance in a case where the print data processing apparatus transfers the image information and the attribute information to the printing apparatus, the printing apparatus is capable of printing which satisfies the index of performance. In other words, the transfer condition is determined based on the index of performance of the printing apparatus, the network band between the print data processing apparatus and the printing apparatus, the size of the compressed image information, and the size of the compressed attribute information. The management unit 221 determines whether the transfer condition is satisfied. In a case where the transfer condition is satisfied, the processing goes to step S608, while on the other hand, in a case where the transfer condition is not satisfied, the processing goes to step S606.

FIG. 14 is a table which provides a summary of examples of three cases of relationships among the index of performance of the printing apparatus, the network band, the transfer performance, and the size of transfer data, which are represented as actual values.

In a case in an upper row 1401, the index of performance of the printing apparatus is 30 ppm and the network band is 5 MB, and thus, the transfer performance is 10 MB. At this time, in a case where the size of transfer data is 8 MB (4.8 MB of image information+3.2 MB of attribute information), the value of the transfer performance is larger than the size of transfer data (the value of the transfer performance>the size of transfer data). Therefore, the management unit 221 determines that the transfer condition is satisfied.

In a case in an intermediate row 1402, the index of performance of the printing apparatus is 40 ppm and the network band is 5 MB, and thus, the transfer performance is 7.5 MB. At this time, in a case where the size of transfer data is 8 MB (4.8 MB of image information+3.2 MB of attribute information), the value of the transfer performance is smaller than the size of transfer data (the value of the transfer performance<the size of transfer data). Therefore, the management unit 221 determines that the transfer condition is not satisfied. In that case, a first conversion of attribute information is performed as described later. In the case in the intermediate row 1402, however, even with the first conversion, the size of transfer data is 7.7 MB (4.8 MB of image information+2.9 MB of attribute information), and the transfer condition is not satisfied. Further, when a second conversion of attribute information is performed, the size of transfer data is 7.4 MB (4.8 MB of image information+2.6 MB of attribute information). At this point in time, therefore, the management unit 221 determines that the transfer condition is satisfied.

In a case in a lower row 1403, the index of performance of the printing apparatus is 30 ppm and the network band is 7 MB, and thus, the transfer performance is 10.5 MB. At this time, in a case where the size of transfer data is 8 MB (4.8 MB of image information+3.2 MB of attribute information), the value of the transfer performance is larger than the size of transfer data (the value of the transfer performance>the size of transfer data). Therefore, the management unit 221 determines that the transfer condition is satisfied.

In a case where at step S605 the management unit 221 determines that the transfer condition is not satisfied, at step S606 the management unit 221 performs conversion on the attribute information outputted by the rendering unit 224. Details of a conversion method will be described later.

At step S607, the compression unit 225 performs lossless compression on the converted attribute information. After that, the processing returns to step S605. Incidentally, in a case where the processing returns from step S607 to step S605, a determination may be made as to whether the transfer condition is satisfied, during the process of step S606 for converting the attribute information, as described later. In a case where a determination is already made by the processing of step S606, another process for making a determination may be omitted when the processing returns to step S605.

Figure 12:
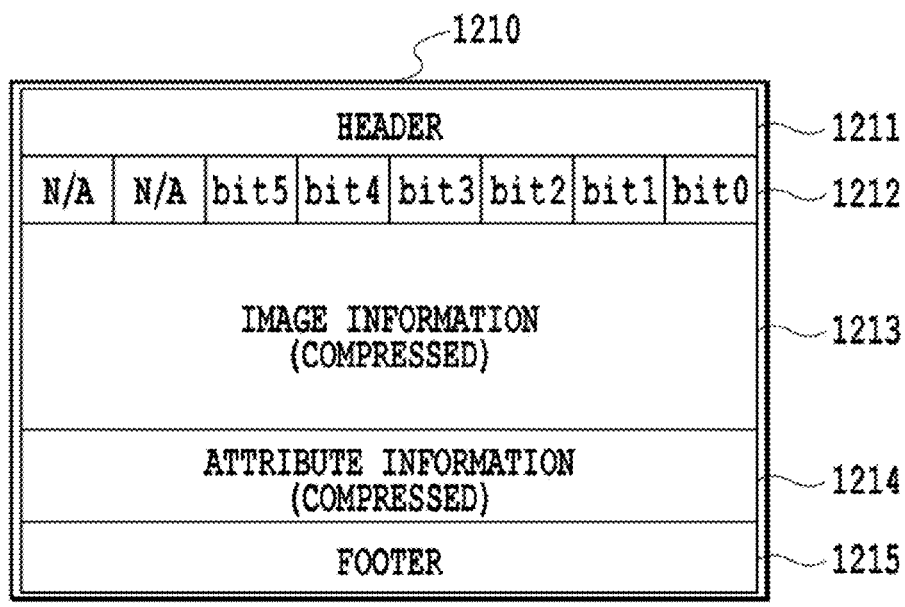
FIG. 12 is an illustration of an example of a data configuration of data which the print data processing apparatus transfers to the printing apparatus, in the first embodiment of the present invention.

At step S608, the management unit 221 transfers the compressed image information and attribute information to the printing apparatus through the network IF 124 by utilizing the network control unit 222. FIG. 12 illustrates an example of a structure of data which is transferred. Compressed image information 1213 and attribute information 1214 are sandwiched in between a header 1211 and a footer 1215. Conversion history information 1212 is information indicating whether the print data processing apparatus has converted attributes of the attribute information. Here, individual pieces of character attribute, lowercase character attribute, line attribute, fine line attribute, graphic attribute and image attribute information are assigned in sequence to bit 0 to bit 5, respectively, and "1" is set to a converted attribute. For example, in a case where the print data processing apparatus converts a character attribute into a background attribute, "1" is set to bit 0.

Figure 7:
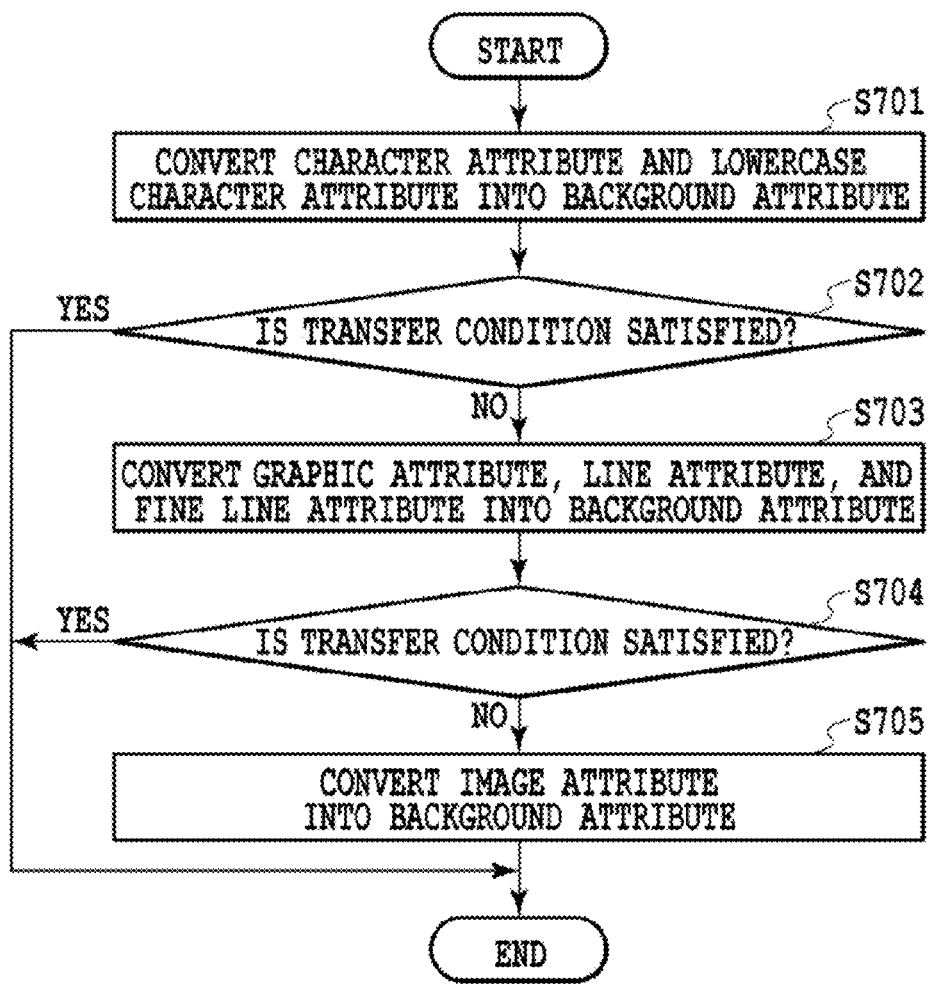
FIG. 7 is a flowchart illustrating an example of a method for converting attribute information in the first embodiment of the present invention.

Next, an attribute conversion method of step S606 will be described in detail with reference to a flowchart of FIG. 7. Generally, in a case where a compression process is performed, a simple shape is higher in compression efficiency than a complex shape. In the first embodiment, therefore, the compression efficiency is improved by reducing attributes of complex shape having low compression efficiency.

At step S701, the management unit 221 converts all character attributes (0x3) and lowercase character attributes (0x7) of the attribute information into background attributes (0xF). Generally, a character present in an electronic document has the character attribute or the lowercase character attribute. The character has a complex shape and hence becomes a factor which reduces the compression efficiency of the attribute information. Meanwhile, background portions having no rendering in the electronic document are collectively present in large amounts. In the first embodiment, therefore, the compression efficiency of the attribute information is improved by converting the character attributes (0x3) and the lowercase character attributes (0x7) into the background attributes (0xF).

At step S702, the management unit 221 determines whether the transfer condition is satisfied. In other words, a check is made as to whether the transfer performance which satisfies the index of performance of the printing apparatus is feasible with the attribute information in which the character attributes and the lowercase character attributes have been converted into the background attributes. Since a check method is the same as the processing of steps S605 to S607 of FIG. 6, description of the check method is omitted here. In a case where the management unit 221 determines that the transfer condition is not satisfied, the processing goes to step S703, while on the other hand, in a case where the management unit 221 determines that the transfer condition is satisfied, the attribute conversion process comes to an end.

At step S703, the management unit 221 converts all graphic attributes (0x1), line attributes (0x2) and fine line attributes (0x6) of the attribute information into background attributes (0xF). Generally, a figure, a halftone formed of large or small dots, a ruled line, a broken line, or the like, which is present in an electronic document, has any one of the graphic attribute, the line attribute, and the fine line attribute. Objects of these attributes are interspersed in a page of the electronic document and also have complex shapes, and thus, the objects are poor in compression efficiency, as compared to objects of the image attribute to be described later, which are collectively present. In the first embodiment, therefore, the compression efficiency of the attribute information is improved by performing the first conversion process for the character attributes (0x3) and the lowercase character attributes (0x7), and then performing the second conversion process which involves converting the graphic attributes (0x1), the line attributes (0x2) and the fine line attributes (0x6) into the background attributes (0xF).

At step S704, the management unit 221 determines again whether the transfer condition is satisfied. In other words, a check is made as to whether the transfer performance which satisfies the index of performance of the printing apparatus is feasible with the attribute information in which the graphic attributes, the line attributes and the fine line attributes have been converted into the background attributes. In a case where the management unit 221 determines that the transfer condition is not satisfied, the processing goes to step S705, while on the other hand, in a case where the management unit 221 determines that the transfer condition is satisfied, the attribute conversion process comes to an end.

In a case where at step S704 the management unit 221 determines that the transfer condition is not satisfied, at step S705 the management unit 221 performs a third conversion process to convert image attributes (0x0) into background attributes (0xF). Generally, a photographic image present in an electronic document has the image attribute. The image attributes are often collectively present in a region and hence are inherently good in compression efficiency. In the first embodiment, therefore, the image attribute is the last attribute to be converted into the background attribute.

Figure 13:
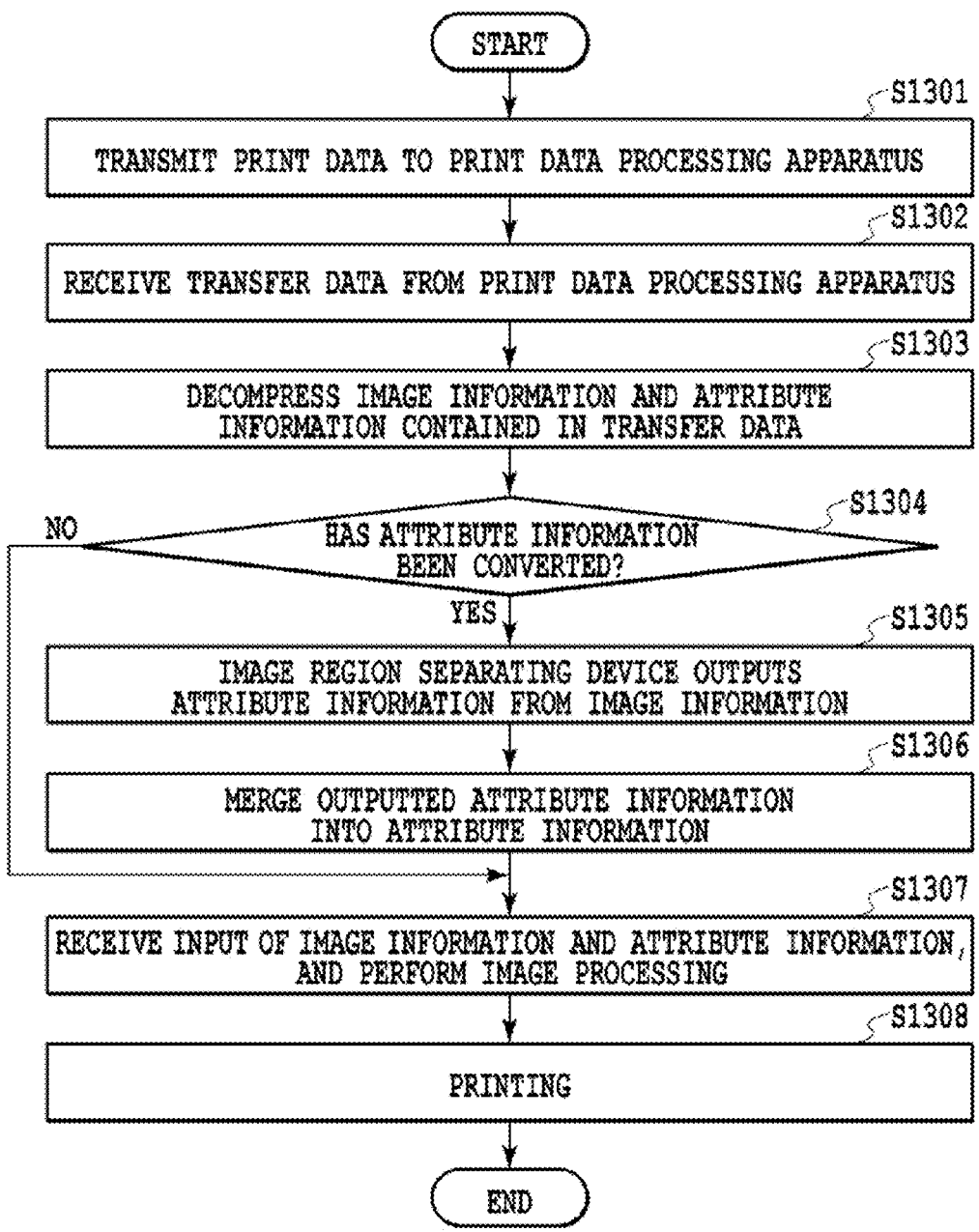
FIG. 13 is a flowchart illustrating an example of a series of processes by the printing apparatus in the first embodiment of the present invention.

FIG. 13 is a flowchart illustrating processing by the software 210 of the printing apparatus in the first embodiment. The processing illustrated in FIG. 13 is implemented by the CPU 111 executing the program stored in the ROM 112.

At step S1301, the management unit 211 transfers print data received by the printing apparatus to the print data processing apparatus through the network IF 115 by utilizing the network control unit 212. Incidentally, step S1301 is not essential processing, and processing may start at step S1302. In other words, the printing apparatus does not transmit the print data to the print data processing apparatus but may use data transmitted from the print data processing apparatus to perform processing described below.

At step S1302, the management unit 211 receives transfer data transmitted by the print data processing apparatus by utilizing the network control unit 212. The transfer data is data as illustrated for example in FIG. 12.

The image information 1213 and the attribute information 1214 contained in the transfer data received at step S1302 are in compressed form, and thus, at step S1303, the decompression device control unit 215 uses the decompression device 114 to decompress the compressed image information and attribute information.

At step S1304, the management unit 211 determines whether or not the attribute information has been converted by the print data processing apparatus, by referring to the conversion history information 1212 contained in the transfer data. In a case where the management unit 211 determines that the attribute information has been converted, the processing goes to step S1305, while on the other hand, in a case where the management unit 211 determines that the attribute information has not been converted, the processing goes to step S1307.

At step S1305, the image region separating device control unit 213 inputs the image information decompressed at step S1303 to the image region separating device 116, which then outputs the attribute information. Description will be given below with reference to FIG. 15 with regard to processing which the image region separating device 116 performs at step S1305.

Figure 15:
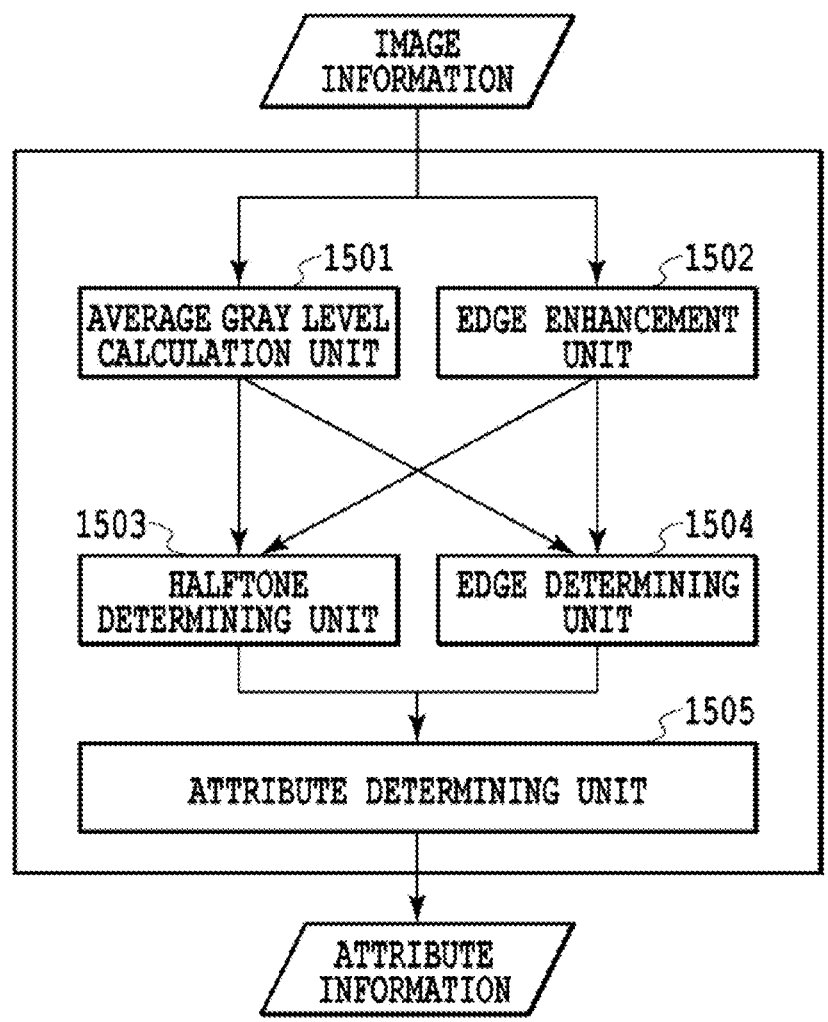
FIG. 15 is a diagram illustrating an example of processing by an image region separating device of the printing apparatus in the first embodiment of the present invention.

FIG. 15 is a diagram illustrating an example of the processing by the image region separating device 116. The image information is inputted to an average gray level calculation unit 1501 and an edge enhancement unit 1502. The average gray level calculation unit 1501 calculates an average gray level of 25 pixels in an area of 5×5 pixels or the like area, for example.

The edge enhancement unit 1502 performs an edge enhancement process in an area of 5×5 pixels or the like area, for example. In the first embodiment, a differential filter having spatial frequency characteristics suitable for extraction of edges of a character and a halftone is used as a filter coefficient for edge enhancement.

The average gray level calculated by the average gray level calculation unit 1501 and edge-enhanced data obtained by the edge enhancement by the edge enhancement unit 1502 are inputted to a halftone determining unit 1503 and an edge determining unit 1504.

The halftone determining unit 1503 extracts a region having a high average gray level and judged as matching a halftone pattern by a pattern matching process, as a halftone, by referring to the average gray level data outputted by the average gray level calculation unit 1501 and the edge-enhanced data outputted by the edge enhancement unit 1502.

The edge determining unit 1504 receives input of the average gray level data outputted by the average gray level calculation unit 1501 and the edge-enhanced data outputted by the edge enhancement unit 1502, and extracts an edge.

An attribute determining unit 1505 determines that a halftone region has a graphic attribute, and determines that an edge portion outside the halftone region has a character attribute.

Thus, the image region separating device 116 is capable of outputting the attribute information from the image information. The attribute information outputted by the image region separating device 116 is the information extracted from the image information as previously mentioned and hence is not necessarily limited to matching the attribute information outputted by the rendering unit 224 under the print data rendering command; however, attribute information required for image processing can be obtained.

At step S1306, the management unit 211 forms new attribute information by merging an attribute in the attribute information outputted at step S1305, which is judged as having experience of conversion, based on the conversion history information 1212, into the attribute information decompressed at step S1303. In other words, the management unit 211 updates the attribute information decompressed at step S1303 by using the attribute information outputted at step S1305.

At step S1307, the image processing device control unit 214 inputs the image information decompressed at step S1303, and the attribute information decompressed at step S1303 or the attribute information merged at step S1306 to the image processing device 117, which then performs image processing.

Incidentally, it is assumed that the processing of steps S1303 to S1307 is always performed at a rate which satisfies PPM serving as the index of performance of the printing apparatus and a series of processes do not form a bottleneck in the performance of the printing apparatus.

At step S1308, the management unit 211 passes results of the image processing obtained at step S1307 to the engine control unit 216, and the engine control unit 216 uses the engine 118 to perform printing.

According to the processing of the first embodiment, the print data processing apparatus, when transferring image information and attribute information to the printing apparatus, converts the attribute information according to the transfer performance, thereby enabling the printing apparatus to perform printing while keeping PPM as the index of performance.

Second Embodiment

In a second embodiment, description will be given with regard to an example in which an attribute information conversion method which is different from that of the first embodiment is used. Incidentally, an apparatus configuration or a flow of processing may be the same as that of the first embodiment, except for matters described below.

Figure 8:
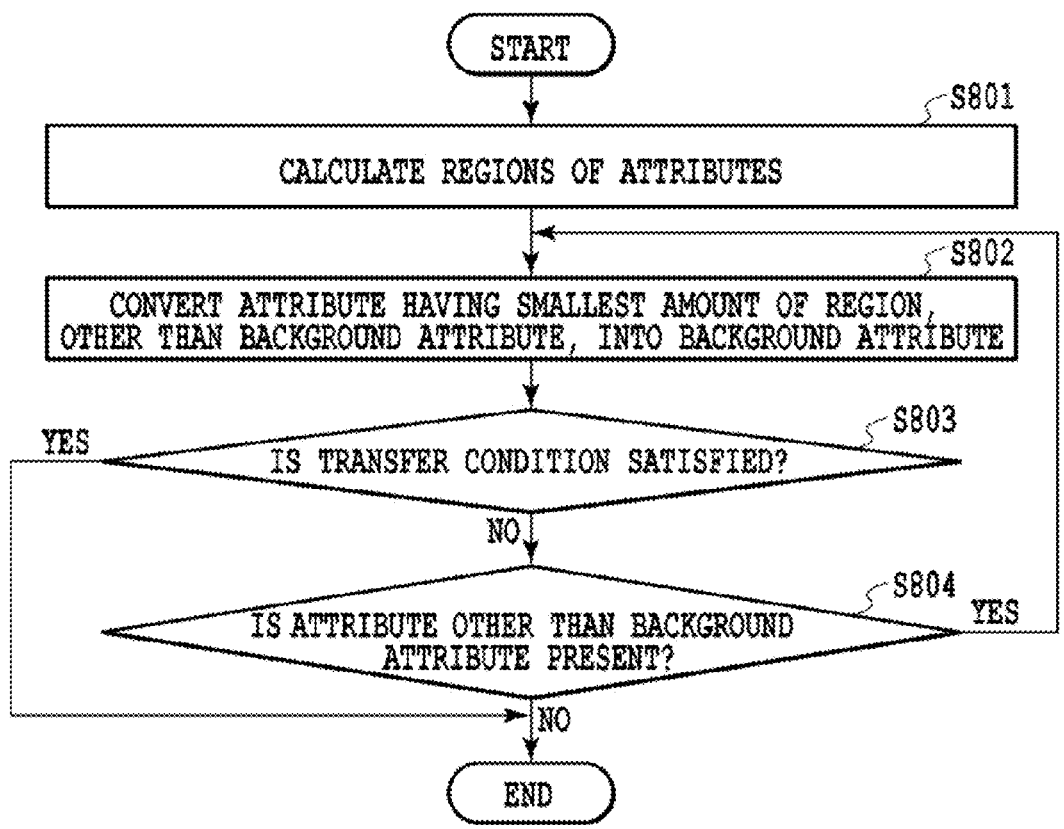
FIG. 8 is a flowchart illustrating an example of a method for converting attribute information in a second embodiment of the present invention.

FIG. 8 is a flowchart illustrating the attribute information conversion method which is different in the processing of step S606 of FIG. 6 from that of the first embodiment. In the second embodiment, the conversion of attributes into background attributes is performed in order, starting at an attribute having a small amount of attribute region, under the assumption that an attribute having a small amount of region in attribute information is not important as compared to an attribute having a large amount of region.

At step S801, the management unit 221 of the print data processing apparatus calculates regions of attributes contained in attribute information.

At step S802, the management unit 221 converts an attribute having the smallest amount of region, other than a background, in the attribute information, into a background attribute (0xF).

At step S803, the management unit 221 determines whether the transfer condition is satisfied. In other words, the management unit 221 checks whether the transfer performance which satisfies the index of performance of the printing apparatus is feasible with the attribute information in which the attribute having the smallest amount of region has been converted into the background attribute. Since a check method is the same as that described for the first embodiment, description of the check method is omitted here. In a case where the management unit 221 determines that the transfer condition is satisfied, the attribute conversion process comes to an end, while on the other hand, in a case where the management unit 221 determines that the transfer condition is not satisfied, the processing goes to step S804.

At step S804, the management unit 221 determines whether an attribute other than the background attribute is present in the current attribute information. In a case where the management unit 221 determines that the attribute other than the background attribute is present in the current attribute information, the processing goes to step S802, while on the other hand, in a case where the management unit 221 determines that the attribute other than the background attribute is absent, the processing for converting the attributes of the attribute information comes to an end.

In the second embodiment, an attribute of an object having a large amount of region to be printed tends to remain, as compared to the first embodiment in which the attribute conversion is performed in a determined order. In a case where the transfer performance is feasible with a small number of conversions performed, there is also a small difference between attribute information before the conversion and attribute information after the conversion, and a large amount of attribute information effective for printing can be inputted to the image processing device 117, so that printed results of high quality can be obtained.

Third Embodiment

In a third embodiment, description will be given with regard to an example in which a different conversion process from the attribute information conversion processes of the first and second embodiments is performed. Incidentally, an apparatus configuration or a flow of processing may be the same as that of the first embodiment, except for matters described below.

Figure 9:
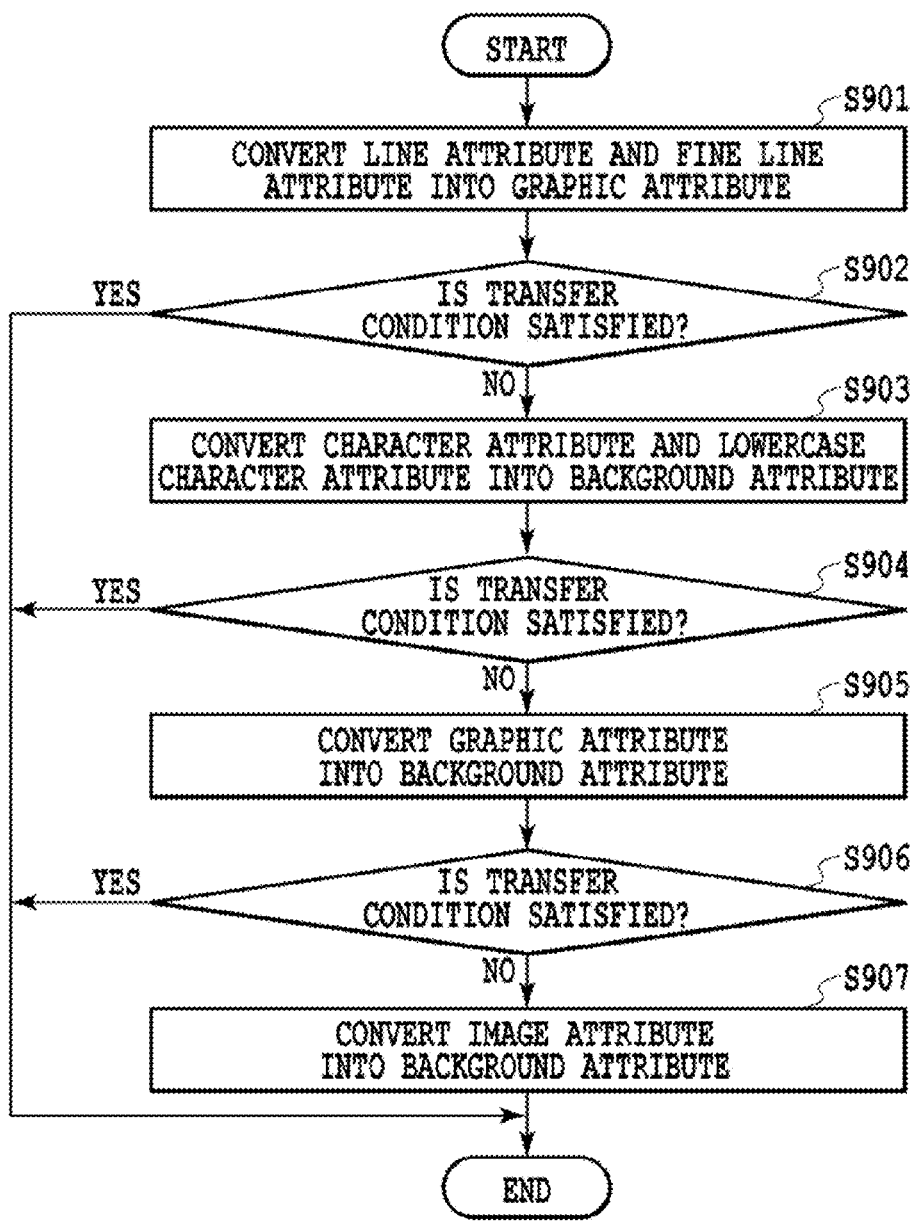
FIG. 9 is a flowchart illustrating an example of a method for converting attribute information in a third embodiment of the present invention.

FIG. 9 is a flowchart illustrating an attribute information conversion method which is different in the processing of step S606 of FIG. 6 from those of the first and second embodiments. Objects of attributes having a strong correlation therebetween are often adjacent to each other, and therefore, in the third embodiment, the compression efficiency of attribute information is improved by, first of all, collecting the adjacent attributes into one.

At step S901, the management unit 221 performs a first conversion to convert line attributes (0x2) and fine line attributes (0x6) of attribute information into graphic attributes (0x1). In a typical electronic document, a graphic attribute has a strong correlation with a line attribute and a fine line attribute, and a contour of an object of the graphic attribute is often represented as an object of the line attribute or the fine line attribute. In this case, the graphic attribute is adjacent in complicated form to the line attribute or the fine line attribute, which in turn becomes a factor which reduces the compression efficiency of the attribute information. In the third embodiment, therefore, the compression efficiency of the attribute information is improved by regarding the line attribute and the fine line attribute as the graphic attribute having a strong correlation therewith, and converting the line and fine line attributes into the graphic attributes.

At step S902, the management unit 221 determines whether the transfer condition is satisfied. In other words, the management unit 221 checks whether the transfer performance which satisfies the index of performance of the printing apparatus is feasible with the attribute information in which the line attributes and the fine line attributes have been converted into the graphic attributes. Since a check method is the same as that described for the first embodiment, description of the check method is omitted here. In a case where the management unit 221 determines that the transfer condition is satisfied, the attribute conversion process comes to an end, while on the other hand, in a case where the management unit 221 determines that the transfer condition is not satisfied, the processing goes to step S903.

At step S903, the management unit 221 performs a second conversion to convert character attributes (0x3) and lowercase character attributes (0x7) of the attribute information into background attributes (0xF). Here, the compression efficiency of the attribute information is improved by converting the attributes of the characters having complex shapes into the background attributes which are collectively present in large amounts, as is the case with step S701 of FIG. 7 described for the first embodiment.

At step S904, the management unit 221 determines again whether the transfer condition is satisfied. In other words, the management unit 221 checks whether the transfer performance which satisfies the index of performance of the printing apparatus is feasible with the attribute information in which the character attributes and the lowercase character attributes have been converted into the background attributes. In a case where the management unit 221 determines that the transfer condition is satisfied, the attribute conversion process comes to an end, while on the other hand, in a case where the management unit 221 determines that the transfer condition is not satisfied, the processing goes to step S905.

At step S905, the management unit 221 performs a third conversion to convert graphic attributes (0x1) of the attribute information into background attributes (0xF). As is the case with step S703 of the first embodiment, the graphic attributes are poor in compression efficiency, as compared to the image attributes which are collectively present. Therefore, the compression efficiency of the attribute information is improved by converting the graphic attributes including the graphic attributes into which the line attributes and the fine line attributes have been converted at step S901, into the background attributes.

At step S906, the management unit 221 determines again whether the transfer condition is satisfied. In other words, the management unit 221 checks whether the transfer performance which satisfies the index of performance of the printing apparatus is feasible with the attribute information in which the graphic attributes have been converted into the background attributes. In a case where the management unit 221 determines that the transfer condition is satisfied, the attribute conversion process comes to an end, while on the other hand, in a case where the management unit 221 determines that the transfer condition is not satisfied, the processing goes to step S907.

At step S907, the management unit 221 performs a fourth conversion to convert image attributes (0x0) of the attribute information into background attributes (0xF). As is the case with step S705 of the first embodiment, the image attributes are often collectively present in a region and hence are inherently good in compression efficiency, and therefore, the image attribute is the last attribute to be converted into the background attribute.

In the first embodiment, an attribute of a conversion object is always converted into a background attribute and disappears from attribute information; however, in the third embodiment, the attribute of the conversion object is converted into an attribute having a close correlation therewith and thus does not disappear suddenly from the attribute information. In the third embodiment, in a case where the transfer performance is feasible with a small number of conversions performed, a larger amount of attribute information can be left, and a large amount of attribute information effective for printing can be inputted to the image processing device 117, so that printed results of high quality can be obtained.

Fourth Embodiment

In a fourth embodiment, description will be given with regard to an example in which a different conversion process from the attribute information conversion processes described for the first to third embodiments is performed. Incidentally, an apparatus configuration or a flow of processing may be the same as that of the first embodiment, except for matters described below.

Figure 10:
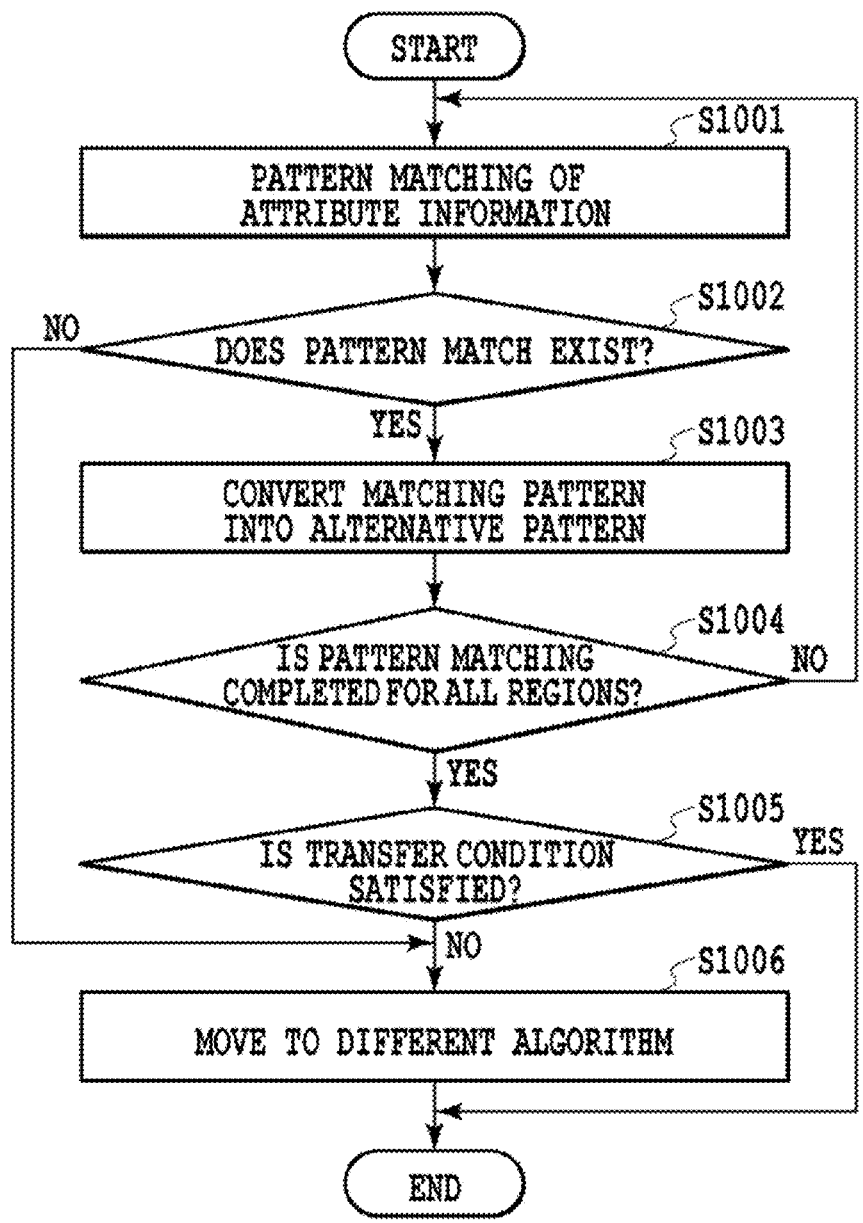
FIG. 10 is a flowchart illustrating an example of a method for converting attribute information in a fourth embodiment of the present invention.

FIG. 10 is a flowchart illustrating an attribute information conversion method which is different in the processing of step S606 of FIG. 6 from those of the first, second and third embodiments. In the fourth embodiment, an easy-to-compress attribute arrangement pattern is prepared beforehand as an alternative to a difficult-to-compress attribute arrangement pattern. Then, in a case where the difficult-to-compress attribute arrangement pattern is found in attribute information, this arrangement pattern is converted into the alternative easy-to-compress attribute arrangement pattern.

Figures 11A, 11B:
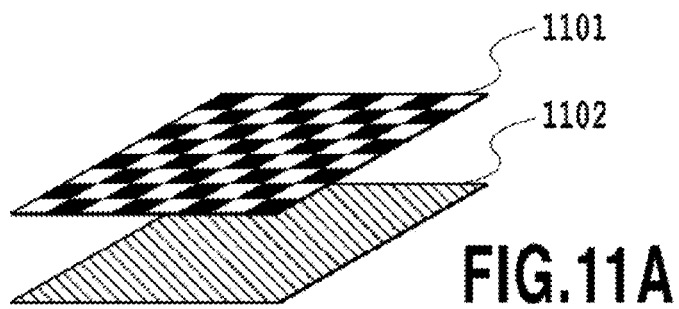
FIGS. 11A and 11B are illustrations of an example of an arrangement pattern of attributes having poor compression efficiency and an arrangement pattern as an alternative thereto in the fourth embodiment of the present invention.

At step S1001, the management unit 221 performs pattern matching on attribute information. In other words, the management unit 221 performs the pattern matching to detect whether a difficult-to-compress attribute arrangement pattern is contained in the attribute information. An arrangement pattern 1120 and an arrangement pattern 1130 illustrated in FIG. 11B are examples of a difficult-to-compress attribute arrangement pattern and an alternative easy-to-compress arrangement pattern prepared beforehand therefor, respectively. The difficult-to-compress attribute arrangement pattern 1120 occurs in printing of a typical electronic document. For example, in a case where a translucent graphic object 1101 is superimposed on an image object 1102 in FIG. 11A, this results in attribute information in which image attributes (0x0) and graphic attributes (0x1) are arranged in a checkered pattern.

At step S1002, the management unit 221 determines whether a region of the attribute information matches a predetermined pattern. In other words, the management unit 221 determines whether the region of the attribute information matches the difficult-to-compress attribute arrangement pattern. In a case where the management unit 221 determines that the region of the attribute information matches the difficult-to-compress attribute arrangement pattern 1120, the processing goes to step S1003, while on the other hand, in a case where the management unit 221 determines that no match exists, the processing goes to step S1006.

At step S1003, the management unit 221 converts the region of the attribute information matching the difficult-to-compress attribute arrangement pattern 1120 into the alternative easy-to-compress arrangement pattern 1130.

At step S1004, the management unit 221 determines whether pattern matching is completed for all regions of the attribute information. In a case where the management unit 221 determines that the pattern matching is completed, the processing goes to step S1005, while on the other hand, in a case where the management unit 221 determines that the pattern matching is not completed, a position on the attribute information where the pattern matching is to be performed is shifted, and there, step S1001 is performed.

At step S1005, the management unit 221 determines whether the transfer condition is satisfied. In other words, the management unit 221 checks whether the transfer performance which satisfies the index of performance of the printing apparatus is feasible with the attribute information in which the attribute arrangement pattern has been converted into the alternative attribute arrangement pattern. Since a check method is the same as that of the first embodiment, description of the check method is omitted here. In a case where the management unit 221 determines that the transfer condition is satisfied, the attribute conversion process comes to an end, while on the other hand, in a case where the management unit 221 determines that the transfer condition is not satisfied, the processing goes to step S1006.

At step S1006, the management unit 221 moves the attribute conversion process to a different algorithm. Here, any one of the conversion processes described for the first to third embodiments, for example, may be used as the different algorithm.

Generally, an object utilized as a background for the entire area or a portion of a page of an electronic document may produce output of attribute information like the difficult-to-compress attribute arrangement pattern 1120. In this case, however, the object utilized as the background is not important for printing.

In the fourth embodiment, first of all, an unimportant but difficult-to-compress attribute arrangement pattern is converted into an easy-to-compress attribute arrangement pattern. Thereby, an attribute which is important in itself, such as a character, line, graphic or image attribute, can be left in attribute information, and a large amount of attribute information effective for printing can be inputted to the image processing device 117, so that printed results of high quality can be obtained.

Other Embodiments

In the above-described embodiments, description has been given with regard to an example in which the print data processing apparatus uses print data received through the network IF 124 by utilizing the network control unit 222. However, the print data processing apparatus may be configured so that a transportable storage medium, for example, is attachable to the apparatus, and may use print data stored in the transportable storage medium to perform the processing described for the above-described embodiments.

Also, after processing image information and attribute information received through the network IF 124 by utilizing the network control unit 222, the print data processing apparatus does not immediately transmit the processed image information and attribute information to the printing apparatus but may temporarily store the processed image information and attribute information in a storage medium such as an HDD (hard disk drive). For example, the processed image information and attribute information may be temporarily stored in the HDD in a case where an available network band is extremely low or in a case where the network in itself is in a stopped state, and the processed image information and attribute information may be transmitted in a case where the network becomes available.

Also, in the above-described first embodiment, description has been given with regard to an example in which information indicating which attribute has undergone the conversion process is used as the conversion history information. However, information indicating that a first attribute has been converted into a second attribute may be used as the conversion history information. In this case, for example when at step S1306 of FIG. 13 the printing apparatus merges attribute information outputted by the image region separating device, the conversion history information may be used to correct the attribute information to be merged.

Also, in the first embodiment, the processing of step S607 of FIG. 6 involves actually performing the attribute information compression process; however, step S607 may involve merely performing processing for calculating the data size of a compressed result. In this case, after at step S605 a determination has been made that the transfer condition is satisfied, the attribute information compression process may be actually performed before the processing of step S608.

Incidentally, the attribute information conversion process may be performed in the following manner: the different conversion processes described for the embodiments may be performed, page by page, on pages contained in print data, or the different conversion processes described for the embodiments may be performed for each individual piece of print data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-155540, filed Jul. 11, 2012, which is hereby incorporated by reference herein in its entirety.

What is claimed is:

1. A print data processing apparatus comprising:
   a generating unit configured to generate image information and attribute information from print data;
   a converting unit configured to convert the attribute information generated by the generating unit;
   a compressing unit capable of compressing the image information generated by the generating unit and the attribute information converted by the converting unit; and
   a transmitting unit configured to transmit the image information and the attribute information compressed by the compressing unit, as transfer data, to a printing apparatus.

2. The print data processing apparatus according to claim 1, further comprising:
   a determining unit configured to determine whether the image information and the attribute information compressed by the compressing unit satisfy a transfer condition,
   wherein the transmitting unit transmits the transfer data to the printing apparatus, in a case where the determining unit determines that the transfer condition is satisfied.

3. The print data processing apparatus according to claim 2, further comprising:
   a control unit configured to perform control so that the converting unit performs a further conversion of the attribute information converted by the converting unit, in a case where the determining unit determines that the transfer condition is not satisfied,
   wherein the determining unit further determines whether the transfer condition is satisfied, by using the attribute information converted under the control of the control unit.

4. The print data processing apparatus according to claim 2, wherein the transfer condition is determined based on an index of performance of the printing apparatus, a network band between the print data processing apparatus and the printing apparatus, the size of the compressed image information, and the size of the compressed attribute information.

5. The print data processing apparatus according to claim 1, wherein the transmitting unit transmits the transfer data containing conversion history information indicating a history of conversion processes performed on the attribute information.

6. The print data processing apparatus according to claim 1, wherein the converting unit converts a first attribute contained in the attribute information into a second attribute.

7. The print data processing apparatus according to claim 1, wherein the converting unit converts an attribute which has a low compression ratio, contained in the attribute information, into an attribute which has a high compression ratio.

8. The print data processing apparatus according to claim 1, wherein the converting unit converts attributes contained in the attribute information in a preset order.

9. The print data processing apparatus according to claim 1, wherein the converting unit converts an attribute having a small amount of region, of attributes contained in the attribute information.

10. The print data processing apparatus according to claim 1, wherein the converting unit converts a first attribute of attributes contained in the attribute information into a second attribute having a high correlation with the first attribute.

11. The print data processing apparatus according to claim 1, wherein in a case where a region of a portion of the attribute information matches a predetermined pattern, the converting unit converts the matching region into a pattern having a high compression ratio.

12. A print data processing apparatus comprising:
    a receiving unit configured to receive transfer data containing at least image information and attribute information;
    an extracting unit configured to extract the attribute information from the image information contained in the transfer data;
    an updating unit configured to update the attribute information contained in the transfer data, based on the attribute information extracted by the extracting unit; and
    a printing unit configured to perform a printing process based on the image information contained in the transfer data and the attribute information updated by the updating unit.

13. The print data processing apparatus according to claim 12, further comprising:
    a determining unit configured to determine whether the received transfer data contains conversion history information indicating a history of conversion processes performed on the attribute information,
    wherein in a case where the determining unit determines that the conversion history information is contained, the extracting unit extracts attribute information from the image information contained in the transfer data, and
    the updating unit performs a further update of the attribute information contained in the transfer data, based on the conversion history information.

14. A print data processing method comprising:
    a generating step of generating image information and attribute information from print data;
    a converting step of converting the attribute information generated in the generating step;
    a compressing step capable of compressing the image information generated in the generating step, and the attribute information converted in the converting step; and
    a transmitting step of transmitting the image information and the attribute information compressed in the compressing step, as transfer data, to a printing apparatus.

* * * * *